United States Patent [19]

Haruyoshi et al.

[11] Patent Number: 4,748,223

[45] Date of Patent: May 31, 1988

[54] PROCESS FOR PRODUCING PEROXIDE-VULCANIZABLE, FLUORINE-CONTAINING ELASTOMER

[75] Inventors: Tatsu Haruyoshi, Hitachi; Okabe Jun, Kitaibaraki; Naraki Akihiro, Kitaibaraki; Abe Masatoshi, Kitaibaraki; Ebina Yoshiaki, Kitaibaraki, all of Japan

[73] Assignee: Nippon Mektron Limited, Tokyo, Japan

[21] Appl. No.: 25,191

[22] Filed: Mar. 12, 1987

[30] Foreign Application Priority Data

Apr. 1, 1986 [JP] Japan .................................. 61-74483
Jan. 3, 1987 [JP] Japan .................................. 62-21591

[51] Int. Cl.$^4$ ............................ C08F 2/00; C08F 8/18
[52] U.S. Cl. .................................. 526/206; 525/326.4
[58] Field of Search ...................... 526/206; 525/326.4

[56] References Cited

U.S. PATENT DOCUMENTS

| | | | |
|---|---|---|---|
| 3,058,929 | 10/1962 | Vanderhoff et al. | 526/206 |
| 3,072,589 | 1/1963 | Rausch et al. | 526/206 |
| 3,101,328 | 8/1963 | Edmonds, Jr. | |
| 3,937,690 | 2/1976 | Weisgerber et al. | 526/206 |
| 4,035,565 | 7/1977 | Apotheker et al. | 525/387 |
| 4,243,770 | 1/1981 | Tatemoto et al. | 525/387 |

FOREIGN PATENT DOCUMENTS

| | | |
|---|---|---|
| 0101930 | 3/1984 | European Pat. Off. ............ 526/206 |
| 2815187 | 10/1978 | Fed. Rep. of Germany . |
| 60-221409 | 11/1985 | Japan .................................. 526/206 |

*Primary Examiner*—Joseph L. Schofer
*Assistant Examiner*—N. Sarofim
*Attorney, Agent, or Firm*—Fred Philpitt

[57] ABSTRACT

A peroxide-vulcanizable, fluorine-containing elastomer having distinguished processability, vulcanization characteristics and physical properties of vulcanized products can be obtained by polymerization of fluorine-containing olefins having 2 to 8 carbon atoms in the presence of an iodine and bromine-containing compound represented by the general formula $RBr_n Im$, where R represents a fluorohydrocarbon group, a chlorofluorohydrocarbon group, a chlorohydrocarbon group or a hydrocarbon group, and n and m are integers of 1 and 2.

13 Claims, No Drawings

PROCESS FOR PRODUCING PEROXIDE-VULCANIZABLE, FLUORINE-CONTAINING ELASTOMER

BACKGROUND OF THE INVENTION

1. Field of the Invention

This invention relates to a process for producing a peroxide-vulcanizable, fluorine-containing elastomer, and more particularly to a process for producing a fluorine-containing elastomer having those halogen atoms in the molecule which can act as cross-linking points for peroxide vulcanization.

2. Description of the Prior Art

Generally, vulcanized fluorine-containing elastomers have distinguished heat resistance, solvent resistance, weathering and ozone resistances, creep resistance, etc., and are commercially widely used as a sealing material for oil seal, packing material, gasket, O ring, etc., or as a diaphragm material, a hose lining material, a coating material, an adhesive, etc.

One of the conventional processes for obtaining such a vulcanized, fluorine-containing elastomer is based on a peroxide vulcanization method using an organic peroxide as a vulcanizing agent, where fluorine-containing elastomers having iodine atoms or bromine atoms as cross-linking points are used. Some of the examples will be given below, and they have the following problems.

Japanese Patent Application Kokai (Laid-open) No. 53-125,491 discloses a process using an iodine compound represented by the general formula Rf Ix, wherein Rf represents a fluorohydrocarbon group or a chlorofluorohydrocarbon group, but this iodine compound is expensive and highly toxic and readily liberates the iodine atoms bonded to the fluorine-containing elastomer, when exposed to light, as disclosed in the following Japanese Patent Application Kokai (Laid-open) No. 60-221,409.

Japanese Patent Application Kokai (Laid-open) No. 60-221, 409, discloses a process using an iodine compound represented by the general formula $RI_{1-2}$, wherein R repesents a hydrocarbon group having 1 to 3 carbon atoms, and this iodine compound is cheap and less toxic than the said compound represented by Rf Ix, but is poor in the vulcanization speed, and the heat resistance and compression set of the vulcanized products.

Japanese Patent Applicaiton Kokai (Laid-open) No. 59-20,310 discloses a process using a bromine compound represented by the general formula $RBr_x$, wherein R represents a saturated aliphatic hydrocarbon group. Inventors of this prior art invention are partly common to those of the prior art invention disclosed in the said Japanese Patent Application Kokai (Laid-open) No. 53-125,491 and state that the fluorine-containing elastomers having bromine atoms are superior in the properties than the said fluorine-containing elastomers having iodine atoms. Indeed, the fluorine-containing elastomers having bromine have a better light stability, but are poor in the vulcanization speed and the heat resistance and compression set of the vulcanized products.

Japanese Patent Publication No. 54-1,585 discloses a process using a brominated olefin compound such as bromotrifluoroethylene, 4-bromo-3,3,4,4-tetrafluorobutene-1, etc., but the thus obtained fluorine-containing elastomers are liable to undergo gelation and are not only poor in the processability (flow characteristics), but also unsatisfactory in the elongation and compression set of the vulcanized products.

Japanese Patent Application Kokai (Laid-open) No. 60-195,113 discloses a process for copolymerizing not more than about 5% by mole, preferably 0.1 to 1.5% by mole, of a vinyl ether monomer acting as a curing site, represented by the general formula:

ROCX=CYZ wherein one or two of X, Y and Z is selected from bromine and iodine atoms, the remainder being hydrogen, fluorine or chlorine atom, and R is a linear or cyclic alkyl group, or alkenyl group or allyl group.

As the monomer having the curable site of vinyl ether, a compound substituted with both bromine and iodine can be selected from the compounds represented by the said general formula, but the said Japanese Patent Application Kokai (Laid-open) No. 60-195,113 discloses that bromine or iodine-containing vinyl ethers, where the halogen substituents represented by X, Y and Z are bromine or iodine, though a little poor, can be used as the monomer having the curable site. The process also has the same disadvantages as those of the art disclosed in the said Japanese Patent Publication No. 54-1585.

The present inventors have made extensive studies of a process for producing a peroxide-vulcanizable, fluorine-containing elastomer having distinguished processability, vulcanization characteristics and physical properties of vulcanized products to overcome the problems of the said prior art, and have found that the problems can be solved by polymerizing a fluorine-containing olefin in the presence of an iodine and bromine-containing compound, thereby introducing both iodine and bromine as cross-linking points into the fluorine-containing elastomer molecules at the same time.

SUMMARY OF THE INVENTION

An object of the present invention is to provide a process for producing a fluorine-containing elastomer having distinguished processability with respect to kneadability, flow characteristics, etc.

Another object of the present invention is to provide a process for producing a fluorine-containing elastomer having distinguished properties of vulcanized products, particularly, with respect to the tensile strength, elongation, heat resistance and compression set.

Other object of the present invention is to provide a process for producing a fluorine-containing elastomer having those halogen atoms in the molecule which can act as cross-linking points for peroxide vulcanization.

These objects can be attained by homopolymerizing or copolymerizing a fluorine-containing olefin having 2 to 8 carbon atoms in the presence of an iodine and bromine-containing compound represented by the general formula $RBr_nI_m$, where R is a fluorohydrocarbon group, a chlorofluorohydrocarbon group, a chlorohydrocarbon group or a hydrocarbon group, and n and m are integers of 1 and 2, thereby producing a peroxide-vulcanizable fluorine-containing elastomer.

DETAILED DESCRIPTION OF THE PREFERRED EMBODIMENTS

The iodine and bromine-containing compound represented by the said general formula is selected from those which cannot lose the effects through side reactions under polymerization conditions, where R is selected from fluorohydrocarbon groups, chlorofluorohydrocarbon groups, chlorohydrocarbon groups or hydrocarbon groups generally having 1 to 10 carbons, and each of the groups may have a functional group such as —O—, —S—, =NR, —COOH, —SO$_2$, —SO$_3$H, —PO$_3$H, etc.

Such iodine and bromine-containing compound may be a saturated or unsaturated linear or aromatic compound, where n and m each are preferably 1. The iodine and bromine-containing compound where at least one of n and m is 2 produces a fluorine-containing elastomer of three-dimensional structure, and thus is desirable to use within such a range as not to deteriorate the processability.

The linear iodine-containing bromine compound includes, for example, 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro (2-methylpropane), monobromomonoiodoperfluorocyclobutane, monobromomonoiodoperfluoropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2trifluoroethane, 1-bromo-2-iodo-1,1-difluoroethane, 1-iodo-2-bromo-1,1-difluoroethane, 1-bromo-2-iodo-1-fluoroethane, -iodo-2-bromo-1-fluoroethane, 1-bromo-2-iodo-1,1,3,3,3-pentafluoropropane, 1-iodo-2-bromo-1,1,3,3,3-penyafluoroproprane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-diiodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoropentene-1, 4-iodo-5-bromoperfluoropentene-1, 4-bromo-5-iodo-1,1,2-trifluoropentene-1, 4-iodo-5-bromo-1,1,2-trifluoropentene-1, 1-bromo-2-iodoperfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl ether, 1-iodo-2-bromoethyl ethyl ether, 1-bromo-2-iodoethyl 2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2iodoethyl), 3,5-bis(2-iodoethyl), 1-(2-bromoethyl), 1-(3iodopropyl)-2-(3-bromopropyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4bromobutyl), 1-(4-iodobutyl)-4-(4-bromobutyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis(3-bromopropyl)-1-(2-iodoethyl), 1-iodo-33-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine and bromine-containing compounds readily undergo radical cleavage under the action of an organic peroxide, radical-generating source, and the monomers undergo addition growth reaction owing to the high reactivity of the generated radicals, and then the reaction is discontinued by withdrawing the iodine and bromine from the iodine and bromine-containing compound to give a fluorine-containing elastomer having iodine and bromine at the molecule terminals.

The iodine and bromine at the molecule terminals of the thus formed fluorine-containing elastomer readily undergo radical cleavage in the presence of a radical generating source, and the resulting polymer radicals have the similar reactivity. Thus, a segmented polymer corresponding to the species of polymerization monomers can be obtained by several runs of polymerization.

These iodine and bromine-containing compounds can generally give fluorine-containing elastomers capable of efficiently attaining cross-linking through bonding to the molecule terminals, and about 0.001 to about 5% by weight, preferably about 0.01 to about 3% by weight each of iodine and bromine must be contained in and bonded to in the resulting fluorine-containing elastomer. Below about 0.001% by weight, the cross-linking density of the fluorine-containing elastomer will be so low that no sufficient vulcanization can be obtained, whereas above 5% by weight, the rubber elasticity (elongation) and heat resistance of vulcanized product will become poor.

The fluorine-containing olefins for use in the polymerizaiton according to the present invention preferably have 2 to 8 carbon atoms, for example, at least one of vinylidene fluoride, tetrafluoroethylene, hexafluoropropene, pentafluoropropene, chlorotrifluoroethylene, perfluoromethyl perfluorovinyl ether, perfluoroethyl perfluorovinyl ether, perfluoropropyl perfluorovinyl ether, and perfluoropropoxypropyl perfluorovinyl ether can be used. Besides, vinyl fluoride, trifluoroethylene, perfluorocyclobutene, perfluoro(methylcyclopropene), hexafluoroisobutene, 1,2,2-trifluorostyrene, perfluorostyrene, etc. can be also used.

These fluorine-containing olefins can be also copolymerized with at least one of olefinic compounds having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroalkyl ether, vinyl perfluoroalkyl ether, perfluorovinyl vinyl ether, etc. It is preferable that the fluorine-containing diene is copolymerized in a proportion of not more than about 1% by mole, as contained in the fluorine-containing elastomer. When copolymerized in a proportion above about 1% by mole, the copolymer elastomer undergoes considerable gelation, deteriorating the processability (flow characteristics) and the elongation of the vulcanized products.

Specifically, the fluorine-containing olefins copolymer includes, for example, hexafluoropropene-vinylidene fluoride copolymer, hexafluoropropene-vinylidene fluoride-tetrafluoroethylene terpolymer, tetrofluoroethylene-vinylidene fluoride-perfluoromethyl perfluorovinyl ether terpolymer, tetrafluoroethylene-vinylidene fluoride-perfluoropropyl perfluorovinyl ether terpolymer, tetrafluoroethyleneperfluoropropoxypropyl perfluorovinyl ether copolymer, tetrafluoroethylene-perfluoromethyl perfluorovinyl ether copolymer, tetrafluoroethylene-propylene copolymer, tetrafluoroethylene-vinylidene fluoride-hexafluoropropenepentafluoropropene quaternary copolymer, tetrafluoroethylenehexafluoropropene-vinylidene fluoride-perfluoromethyl perfluorovinyl ether quaternary copolymer, hetrofluoroethylene-hexafluoropropene-hexafluoroisobutene terpolymer, tetrafluoroethylenecyclohexyl vinyl ether copolymer, hexafluoropropene-vinylidene fluoride-chlorotrifluoroethylene terpolymer, etc.

Polymerization reaction of the fluorine-containing olefin or the fluorine-containing olefin and the said comonomer in the presence of the iodine and bromine-containing compound is carried out according to a so far known process by solution polymerization, suspension polymerization or emulsion polymerization.

In case of the solution polymerization, the polymerization reaction is carried out in a polymerization solvent of less chain transferability, such as perfluoro(1,-2dimethylcyclobutane), perfluoro(1,2-dichloroethane), perfluoro(1,2,2-trichloroethane), perfluorocyclohexane, perfluorotributylamine, α,Ω-dihydroperfluoropolymethylene, perfluoro(methoxypolyethoxyethane), perfluorocyclobutane, tert-butanol, etc., using a polymerization initiator such as fluorine-containing organic peroxides, organic azo compounds, fluorine-containing organic azo compounds, etc. or these polymerization initiators as in a redox system in combination with a reducing agent, for example, an organo-metal compound such as triethylaluminum, triethylboron, diethylzinc, etc., a tertiary amine, mercaptanes, etc.

In case of the suspension polymerization, polymerization reaction is carried out while dispersing the monomer in water, using a polymerization initiator such as organic peroxides, fluorine-containing organic azo compounds, etc. (directly or in a solution in a solvent such as trifluorotrichloroethane, methyl chloroform, dichlorotetrafluoroethane, difluorotetrachloroethane, etc.) or these polymerization initiators as in a redox system in combination with a reducing agent, for example, an organometal compound such as triethylaluminum, triethylboron, diethylzinc, etc., a tertiary amine, mercaptanes, etc.

In case of the emulsion polymerization reaction, a water-soluble polymerization initiator such as an inorganic peroxide, for example, persulfate, hydrogen peroxide, perchlorate, etc., and an organic peroxide such as tert-butyl hydroperoxide, disuccinyl peroxide, etc. is used. These polymerization initiators can be also used as a redox system using a reducing agent such as sulfite, hyposulfite, ascorbic acid, ferrous salts, sodium hydroxymethanosulfinate, etc. together.

The molecular weight of the fluorine-containing elastomer can be adjusted with a chain transfer agent such as methanol, ethanol, isopentane, ethyl acetate, dietyl malonate, carbon tetrachloride, etc. Furthermore, in order to attain the stable dispersion of polymer particles in a polymerization solution, an increase in the polymer concentration, prevention of polymers from deposition onto the polymerization reactor wall, etc., an emulsifier such as fluorine-containing carboxylates, fluorine-containing sulfonates, etc. can be also used.

These various types of polymerization reaction are carried out in such a temperature that no depolymerization of the thus formed polymer takes place as a result of progress of radical reaction, generally at a temperature of $-30°$ to $150°$ C. However, in case of the redox system, the polymerization reaction takes place at a temperature of $0°$ to $50°C$. By carrying the polymerization reaction in such a range of low temperature, thermal decomposition of the iodine and bromine-containing compound can be suppressed, and the cross-linking density of the vulcanized product can be increased.

The polymerization pressure is not particularly limited, and a broad pressure range can be used in accordance with desired rate and degree of polymerization, but generally the polymerization is carried out in a range of about 1 to about 100 $kgf/cm^2$.

The fluorine-containing elastomer obtained according to the present invention can be cured according to various known vulcanization methods, for example, by peroxide vulcanization using an organic peroxide, by polyamine vulcanization using a polyamine compound, by polyol vulcanization using a polyhydroxy compound, or by irradiation of radiations, electron beams, etc. Above all, the elastomer cured by peroxide vulcanization can have a higher mechanical strength and a carbon-carbon bonds of stable structure at the cross-linking points. That is, the peroxide vulcanization can give vulcanized products having distinguished chemical resistance, solvent resistance, etc. and thus is particularly preferable.

The organic peroxide for use in the peroxide vulcanization includes, for example, 2,5-dimethyl-2,5-bis(tert-butylperoxy)hexane, 2,5-dimethyl-2,5-bis(tert-butylperoxy) hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethyl cyclohexane, 2,5-dimethylhexane-2,5-dihydroxyperoxide, α,ω'-bis(tert-butylperoxy)-p-diisopropylbenzene, 2,5-dimethyl-2,5-di(benzoylperoxy)hexane, tertbutylperoxyisopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. can be usually used as a co-cross-linking agent to obtain more distinguished vulcanization characteristics, mechanical strength and compression set.

An oxide or hydroxide of divalent metal, such as oxides or hydroxides of calcium, magnesium, lead, zinc, etc. can be used as a cross-linking aid, depending upon the desired purpose. These compounds also act as an acid acceptor.

The foregoing components for the peroxide vulcanization system are used in the following proportion. About 0.1 to about 10 parts by weight, preferably about 0.5 to about 5 parts by weight, of the organic peroxide; about 0.1 to about 10 parts by weight, preferably about 0.5 to about 5 parts by weight, of the co-cross-linking agent; and not more than about 15 parts by weight of the cross-linking aid are used on the basis of 100 parts by weight of the fluorine-containing elastomer.

The foregoing components for the peroxide vulcanization can be blended and kneaded into the fluorine-containing elastomer directly as such or after diluted with carbon black, silica, clay, talc, diatomaceous earth, barium sulfate, etc., or as a master batch dispersion with the fluorine-containing elastomer. In addition to the foregoing components, so far well known filler, reinforcing agent, plasticize lubricant, processing aid, pigment, etc. can be appropriately added to the blend.

The present fluorine-containing elastomer can be also blended and co-cross-linked with other peroxide-cross-linking substances such as silicone oil, silicone rubber, fluorosilicone rubber, fluorophosphazene rubber, ethylene-vinyl acetate copolymer, ethylene-acrylate copolymer, ethylenepropylene (-diene) copolymer rubber, acrylonitrile-butadiene copolymer rubber, acrylate rubber, etc.

Vulcanization can be carried out by heating after the said components have been blended according to an ordinary blending method, for example, by roll mixing, by kneader mixing, by banbury mixing, by solution mixing, etc. The heating is carried out generally in two steps or one step, i.e. by primary vulcanization at about 100° to about 250° C. for about 1 to about 120 minutes and by secondary vulcanization at about 150° to about 300° C. for 0 to 30 hours.

The fluorine-containing elastomer obtained according to the present invention is not only distinguished in the processability but also largely improved in the vulcanization characteristics by peroxide vulcanization and properties of vulcanized products (mechanical strength, elongation, heat resistance, compression set, etc.), and thus can be effectively used in any of the aforementioned applications.

The present invention will be described below, referring to Examples.

EXAMPLE 1

1,500 ml of deionized water and 7.5 g of ammonium perfluorooctanoate were charged into an autoclave having a net capacity of 3 l, and the inside space of the autoclave was thoroughly flushed with a gas mixture of vinylidene fluoride/hexafluoropropene/tetrafluoroethylene in a ratio by mole of 42/38/20. Then, the inside pressure was increased to 12 kg/cm$^2$ gauge with this gas mixture, and then 2.0 g of 1-bromo-2-iodoperfluoroethane was injected therein. The temperature was increased to 80° C. with stirring, where the inside pressure reached 16 kg/cm$^2$ gauge.

Then, 2 g of ammonium persulfate dissolved in 20 ml of deionized water was added thereto to initiate the polymerization reaction. Since the inside pressure was decreased as the reaction advanced, and when the inside pressure was lowered down to 15 kg/cm$^2$ gauge, it was again increased to 16 kg/cm$^2$ gauge with a gas mixture of vinylidene fluoride/hexafluoropropene/tetrafluoroethylene in a ratio by mole of 58/20/22. The polymerization was likewise continued under a pressure between 15 and 16 kg/cm$^2$ gauge, and 3 hours thereafter, the unreacted gas mixture was purged from the autoclave to discontinue the polymerization reaction.

Then, an aqueous 5 wt. % potassium alum solution was added to the thus obtained aqueous emulsion to coagulate the formed polymers, followed by water washing and drying, and 508 g of rubbery polymers were obtained.

EXAMPLE 2

Polymerization reaction was carried out in the same manner as in Example 1, except that the same amount of 1-bromo-2-iodo-1-chloro-1,2,2-trifluoroethane was used in of 1-bromo-2-iodoperfluoroethane of Example 1, and 462 g of rubbery polymers were obtained.

EXAMPLE 3

Polymerization reaction was carried out in the same manner as in Example 1, except that a gas mixture of vinylidene fluoride/hexafluoropropene was used as the fluorine-containing monomer gas mixture in a ratio by mole of 50/50 for the initial charging and 78/22 for the intermediate charging, and 475 g of rubbery polymers were obtained.

EXAMPLE 4

Polymerization reaction was carried out in the same manner as in Example 1, except that the amount of 1-bromo-2-iodoperfluoroethane was changed to 1.6 g and 0.2 g of 3-bromo-4-iodoperfluorobutene-1 was used together, and 492 g of rubbery polymers were obtained.

EXAMPLE 5

Polymerization reaction was carried out in the same manner as in Example 1, except that a gas mixture of vinylidene fluoride/tetrafluoroethylene/perfluoromethyl perfluorovinyl ether in a ratio by mole of 69/20/11 was used as the fluorine-containing monomer gas mixture throughout the polymerization reaction, and 426 g of rubbery polymers were obtained.

COMPARATIVE EXAMPLE 1

Polymerization reaction was carried out in the same manner as in Example 1, except that no 1-bromo-2iodoperfluoroethane was used, the amount of ammonium persulfate was changed to 3 g, and 5 g of acetone was used as a chain transfer agent, and 562 g of rubbery polymers were obtained.

EXAMPLE 6

1,500 ml of deionized water and 7.5 g of ammonium perfluorooctanoate were changed into an autoclave having a net capacity of 3 l, and 5 g of disodium hydrogen phosphate·12 hydrates and 5 g of sodium hydroxide dissolved in 20 ml of deionized water were added thereto to adjust the pH to about 10. Then, an aqueous solution containing 1 g of ammonium persulfate in 10 ml of deionized water was added thereto, and the inside space of the autoclave was thoroughly flushed with a nitrogen gas. After the autoclave was thoroughly cooled, a gas mixture of vinylidene fluoride/tetrafluoroethylene/perfluoromethyl perfluorovinyl ether in a ratio by mole of 72/18/10 and 8.2 g of perfluoro [1-(--)-4-(--)benzene] were charged into the autoclave, and the inside temperature was increased to 80° C. with stirring, whereby the inside pressure reached 46 kg/cm$^2$ gauge.

The inside pressure was decreased as the reaction progressed, as 24 hours thereafter the inside pressure reached 4 kg/cm$^2$ gauge. Then, the autoclave was cooled, and the residual gas was discharged from the autoclave to discontinue the polymerization reaction. An aqueous 18 wt. % sodium chloride solution was added to the thus obtained aqueous emulsion to coagulate the polymers, followed by water washing and drying. 325 g of rubbery polymers were obtained.

COMPARATIVE EXAMPLE 2

Polymerization reaction was carried out in the same manner as in Example 6, except that 6.4 g of bromotrifluoroethylene was used in place of perfluoro[1-(--)-4-(---)benzene], and 295 g of rubbery polymers were obtained.

COMPARATIVE EXAMPLE 3

Polymerization reaction was carried out in the same manner as in Example 6, except that the ratio by mole of the gas mixture was changed to 70/15/15, and 5.8 g of 1-bromo-2,2difluoroethylene was used in place of perfluoro[1-(--)-4-(--)benzene], and 274 g of rubbery polymers were obtained.

20 parts by weight of MT carbon black, 1.5 parts by weight of 2,5-dimethyl-2,5-di(tert-butylperoxy)hexane, 3 parts by weight of lead oxide and 4 parts by weight of triallyl isocyanurate were roll kneaded into 100 parts by weight each of the fluorine-containing elastomers obtained in the foregoing Examples and Comparative Examples. All of the kneaded mixtures had good processability in respect to kneadability, flowability, etc.

The kneaded mixtures were press-vulcanized at 160° C. for 10 minutes and oven-vulcanized at 180° C. for 4 hours to obtain sheet-shaped and O ring-shaped vulcanized products. The kneaded mixture containing the elastomer of Comparative Example 1 could not be vulcanized, but was only foamed.

Each of the vulcanized products was subjected to determination of normal state physical properties and others in the following manner. The results are shown in the following Table 1 together with the intrinsic viscosity, ratio by mole of comonomer composition (by $^{19}$F - NMR) and iodine and bromine content of the fluorine-containing elastomers.

Normal state physical properties: by JIS K-6301

Heat aging resistance: measured as a ratio of change in tensile strength after exposed to 230° C. in a gear oven for 70 hours.

Compression set: measured by 25% compressing a P-24 O ring having a wire diameter of 3.5 mm at 20° C. for 70 hours.

TABLE 1

| Examples | | Ex. 1 | Ex. 2 | Ex. 3 | Ex. 4 | Ex. 5 | Ex. 6 | Comp Ex. 2 | Comp Ex. 3 |
|---|---|---|---|---|---|---|---|---|---|
| (Fluorine-containing elastomer) | | | | | | | | | |
| Intrinsic viscosity ($\eta$) (MeEtCO, 35° C.) | | 0.68 | 0.63 | 0.59 | 0.62 | 0.72 | 0.97 | 0.39 | 0.87 |
| Composition | CH$_2$=CF$_2$ | 58 | 57 | 81 | 60 | 70 | 70 | 67 | 68 |
| (mol. %) | CF$_3$CF=CF$_2$ | 17 | 18 | 19 | 17 | | | | |
| | CF$_2$=CF$_2$ | 25 | 25 | | 23 | 20 | 20 | 22 | 17 |
| | CF$_3$OCF=CF$_2$ | | | | | 10 | 10 | 11 | 11 |
| Iodine and bromine content (wt. %) | | 0.25 | 0.25 | 0.27 | 0.22 | 0.30 | 1.41 | 0.31 | 0.42 |
| (Result of measurement) | | | | | | | | | |
| Normal | Hardness (JIS-A) | 72 | 71 | 70 | 73 | 70 | 65 | 66 | 65 |
| state | 100% modulus (kgf/cm$^2$) | 30 | 28 | 26 | 37 | 30 | 28 | — | 38 |
| physical | Tensile strength (kgf/cm$^2$) | 260 | 251 | 262 | 283 | 249 | 138 | 43 | 107 |
| properties | Elongation (%) | 480 | 475 | 491 | 423 | 460 | 252 | 90 | 188 |
| Heat aging resistance (As a ratio of change in tensile strength) (%) | | −11 | −15 | −10 | −13 | −19 | −13 | −35 | −28 |
| Compression set (%) | | 31 | 33 | 32 | 30 | 34 | 33 | 100 | 78 |

EXAMPLE 7

Polymerization reaction is carried out in the same manner as in Example 1, except that 1.6 g of bromochloriodomethane was used in place of 1-bromo-2-iodoperfluoroethane, and 475 g of rubbery polymers were obtained.

EXAMPLE 8

Polymerization reaction was carried out in the same manner as in Example 1, except that 2.6 g of 3-oxa-1-iodo-2,5-dichloro-6-bromoperfluorohexane was used in place of 1-bromo-2-iodoperfluoroethane, and 499 g of rubbery polymers were obtained.

The rubbery polymers obtained in Examples 7 and 8 were subjected to determination of halogen contents, normal state physical properties, heat aging resistance and compression set. The results are shown in the following Table 2.

TABLE 2

| Item | | Ex. 7 | Ex. 8 |
|---|---|---|---|
| Iodine and bromine content (wt. %) | | 0.26 | 0.22 |
| Normal | Hardness (wt. %) | 69 | 71 |
| state | 100% modulus (kgf/cm$^2$) | 23 | 31 |
| physical | Tensile strength (kgf/cm$^2$) | 210 | 242 |
| properties | Elongation (%) | 452 | 405 |
| Heat aging resistance (as a ratio of change in tensile | | −14 | −16 |

TABLE 2-continued

| Item | Ex. 7 | Ex. 8 |
|---|---|---|
| strength % ) | | |
| Compression set (%) | 36 | 31 |

EXAMPLE 9

1,500 ml of deionized water and 7.5 g of ammonium perfluorooctanoate were charged into an autoclave having a net capacity of 3 l, and the inside space was flushed with a nitrogen gas. Then, a gas mixture of vinylidene fluoride/hexafluoropropene/tetrafluoroethylene in a ratio by mole of 35/45/20 was introduced into the autoclave until the inside pressure reached 12 kg/cm$^2$ gauge. Then, 4.4 g of 1-bromo-2-iodoperfluoroethane was introduced therein under pressure, and the inside temperature was increased to 50° C.

3.5 g of ammonium persulfate, 0.4 g of ferrous sulfate·7 hydrate and 1.0 g of sodium sulfite, each as aqueous solutions in deionized water, were separately added thereto under pressure, and then a gas mixture of vinyldene fluoride/hexafluoropropene/tetrafluoroethylene in a ratio by mole of 48/30/22 for the intermediate charging was charged into the autoclave until the inside pressure reached 16 kg/cm$^2$ gauge to initiate the polymerization reaction. Immediately after the start of the reaction, the inside pressure was lowered, and when it was lowered to 15 kg/cm$^2$ gauge, it was increased again to 16 kg/cm$^2$ gauge. Thereafter, the polymerization reaction was continued while likewise maintaining the inside pressure at 15 to 16 kg/cm$^2$ gauge, and 2 hours thereafter, the unreacted gas mixture was purged from the autoclave to discontinue the reaction.

Then, an aqueous 5 wt. % potassium alum solution was added to the thus obtained aqueous emulsion to coagulate the thus formed polymers, followed by water washing and drying, and 433 g of rubbery polymers were obtained.

EXAMPLE 10

Polymerization reaction was carried out in the same manner as in Example 9, except that the polymerization temperature was changed to 40° C. and the ratio by mole of the gas mixture for the intermediate charging was changed to 46/35/19, and 398 g of rubbery polymers were obtained.

EXAMPLE 11

Polymerization reaction was carried out in the same manner as in Example 9, except that the polymerization reaction was changed to 30° C. and the ratio by mole of the gas mixture for intermediate charging was changed to 44/39/17, and 365 g of rubbery polymers were obtained.

EXAMPLE 12

Polymerization reaction was carried out in the same manner as in Example 11, except that a ratio by mole of a gas mixture for immediate charging was changed to 40/38/22, and 373 g of rubbery polymers were obtained.

EXAMPLE 13

Polymerization reaction was carried out in the same manner as in Example 9, except that 0.5 g of ascorbic acid and 0.2 g of sodium hydroxymethanesulfinate were used in place of ferrous sulfate·7 hydrate and sodium sulfite, and 418 g of rubbery polymers were obtained.

EXAMPLE 14

1,500 ml of deionized water, 7.5 g of ammonium perfluorooctanoate and 3.3 g of 1-bromo-2-iodoperfluoroethane were charged into an autoclave having a net capacity of 3 l, and a gas mixture of vinylidene fluoride/hexafluoropropene/tetrafluoroethylene in a ratio by mole of 39/41/20 was introduced into the autoclave until the inside pressure reached 16 kg/cm$^2$ gauge at 45° C. Then, 5.1 g of ammonium persulfate and 0.51 g of acidic sodium sulfite dissolved in 90 ml of deionized water was added thereto to initiate the polymerization reaction.

The inside pressure was decreased as the polymerization reaction progressed, and when the inside pressure was lowered to 15 kg/cm$^2$ gauge, it was increased again to 16 kg/cm$^2$ gauge with the gas mixture of the said composition. The reaction was continued for 9 hours, and the unreacted gas mixture was purged from the autoclave to discontinue the reaction. Then, an aqueous 5 wt. % potassium alum solution was added to the thus obtained aqueous emulsion to coagulate the formed polymers, followed by water washing and drying, and 446 g of rubbery polymers were obtained.

EXAMPLE 15

960 ml of deionized water, 1.8 g of 1-bromo-2-iodoperfluoroethane, 4.2 g of ammonium perfluorooctanoate, 4.2 g of disodium hydrogen phosphate·12 hydrate, 0.075 g of sodium hydroxide, 4.8 g of ammonium persulfate and 0.3 g of acidic sodium sulfite were charged into an autoclave having a net capacity of 3 l, and then 480 g of perfluoromethyl vinyl ether and 192 g of tetrafluoroethylene were added thereto.

Copolymerization reaction was carried out at a reaction temperature of 50° C. for 24 hours, and then the unreacted gas mixture was purged from the autoclave to discontinue the reaction. An aqueous 5 wt. % potassium alum solution was added to the thus obtained aqueous emulsion to coagulate the formed polymers, followed by water washing and drying, and 410 g of rubbery polymers were obtained.

The rubbery polymers (fluorine-containing elastomers) obtained in the foregoing Example 9 to 14 were subjected to the same determination as in Table 1.

The rubbery polymers obtained in Example 15 was roll-kneaded and vulcanized in the following manner: 100 parts by weight of fluorine-containing elastomer, 15 parts by weight of MT carbon black, 0.76 parts by weight of 2,5-dimethyl-2,5-di(tert-butylperoxy)hexane, 3 parts by weight of lead oxide and 2 parts by weight of trialkyl cyanurate were roll-kneaded, and press-vulcanized at 180°C. for 10 minutes and oven-vulcanized at 175° C. for 6 hours, and the resulting O ring-shaped vulcanized product was subjected to the same determination as in Table 1. The results are shown in the following Table 3.

TABLE 3

| Example | Ex. 9 | Ex. 10 | Ex. 11 | Ex. 12 | Ex. 13 | Ex. 14 | Ex. 15 |
|---|---|---|---|---|---|---|---|
| (Fluorine-containing elastomer) | | | | | | | |

TABLE 3-continued

| Example | | Ex. 9 | Ex. 10 | Ex. 11 | Ex. 12 | Ex. 13 | Ex. 14 | Ex. 15 |
|---|---|---|---|---|---|---|---|---|
| Intrinsic viscosity ($\eta$) (MeEtCO, 35° C.) | | 1.1 | 1.3 | 1.3 | 1.0 | 0.8 | 0.9 | 0.4 |
| Composition (mol %) | $CH_2=CF_2$ | 50 | 50 | 50 | 46 | 50 | 51 | |
| | $CF_3CF=CF_2$ | 24 | 24 | 24 | 25 | 24 | 24 | |
| | $CF_2=CF_2$ | 26 | 26 | 26 | 29 | 26 | 25 | 52 |
| | $CF_3OCF=CF_2$ | | | | | | | 48 |
| Iodine and bromine content (wt. %) | | | | | | | 0.37 | 0.19 |
| (Result of measurement) | | | | | | | | |
| Normal state physical properties | Hardness (JIS-A) | 72 | 71 | 73 | 70 | 75 | 79 | 76 |
| | 100% modulus (kgf/cm$^2$) | 48 | 45 | 51 | 46 | 42 | 54 | 60 |
| | Tensile strength (kgf/cm$^2$) | 232 | 253 | 229 | 261 | 208 | 248 | 177 |
| | Elongation (%) | 394 | 453 | 403 | 441 | 491 | 327 | 232 |
| Heat aging resistance (As a ratio of change in tensile strength) (%) | | — | — | — | — | — | −6 | −4 |
| Compression set (%) | | 45 | 40 | 32 | 36 | 35 | 36 | 43 |

What is claimed is:

1. A process for producing a peroxide-vulcanizable, fluorine-containing elastomer, which comprises homopolymerizing or copolymerizing a fluorine-containing olefin having 2 to 8 carbon atoms in the presence of a radical polymerization iniator and an iodine and bromine-containing compound represented by the general formula:

$$RBr_nI_m$$

where R is a fluorohydrocarbon group, a chlorofluorohydrocarbon group, a chlorohydrocarbon group or a hydrocarbon group, and n and m are integers of 1 and 2.

2. A process according to claim 1, wherein the iodine and bromine-containing compound is a linear compound.

3. A process according to claim 2, wherein the linear iodine and bromine-containing compound is a saturated compound.

4. A process according to claim 2, wherein the linear iodine and bromine-containing compound is an unsaturated compound.

5. A process according to claim 1, wherein the iodine and bromine-containing compound is an aromatic compound.

6. A process according to claim 5, wherein the aromatic iodine and bromine-containing compound is an perfluoro[iodoalkylbromoalkyl benzene].

7. A process according to claim 5, wherein the aromatic iodine and bromine-containing compound is perfluoro[iodoethyl bromoethylbenzene].

8. A process according to claim 1, wherein 0.001 to 5% by weight of the iodine and bromine-containing compound in terms of iodine and bromine is contained in the fluorine-containing elastomer as bonded.

9. A process according to claim 1, wherein the polymerization reaction is carried out in the presence of a polymerization initiator at a temperature of −30° to 150° C.

10. A process according to claim 1, wherein the polymerization reaction is carried out in the presence of a polymerization initiator of redox system at a temperature of 0° to 50° C.

11. A process according to claim 1, wherein the fluorine-containing olefin is copolymerized with at least one of an olefinic compound having 2 to 6 carbon atoms and a fluorine-containing diene having 4 to 8 carbon atoms.

12. A process according to claim 11, wherein the olefinic compound is in an amount of 0.1 to 50% by mole as copolymerized in the fluorine-containing elastomer.

13. A process according to claim 11, wherein the fluorine-containing diene is used in an amount of not more than 1% by mole, as contained in the fluorine-containing elastomer.

* * * * *

UNITED STATES PATENT AND TRADEMARK OFFICE
CERTIFICATE OF CORRECTION

PATENT NO. : 4,748,223

DATED : May 31, 1988

INVENTOR(S) : HARUYOSHI TATSU et al

It is certified that error appears in the above-identified patent and that said Letters Patent is hereby corrected as shown below:

On the title page, under item [19], "Haruyoshi et al." should be --Tatsu et al.--; and item [75] should read --[75] Inventors: HARUYOSHI TATSU, Hitachi; JUN OKABE, Kitaibaraki; AKIHIRO NARAKI, Kitaibaraki; MASATOSHI ABE, Kitaibaraki; YOSHIAKI EBINA, Kitaibaraki, all of Japan --.

Signed and Sealed this

Thirtieth Day of October, 1990

Attest:

HARRY F. MANBECK, JR.

*Attesting Officer*     *Commissioner of Patents and Trademarks*